April 20, 1943.  F. SCHREYER  2,316,888
TRAP AND BAIT BOX THEREFOR
Filed Oct. 8, 1941
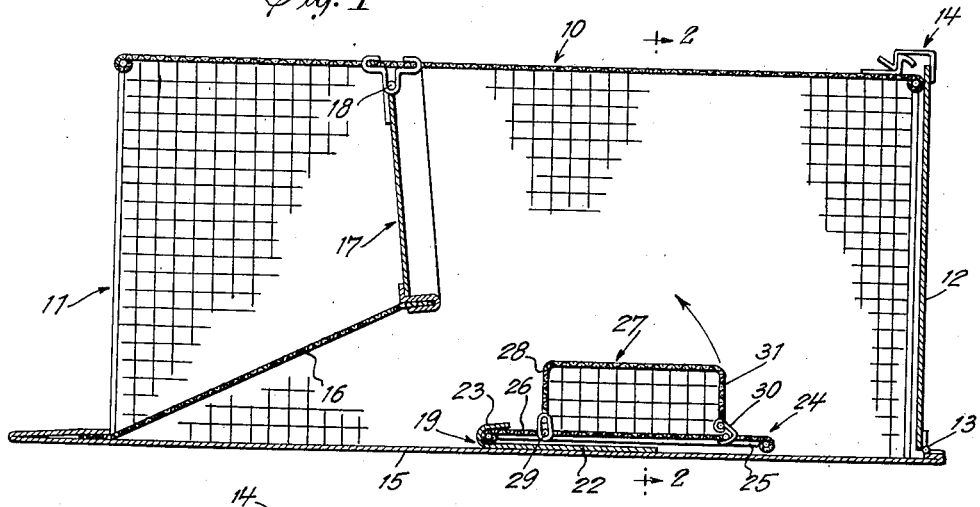
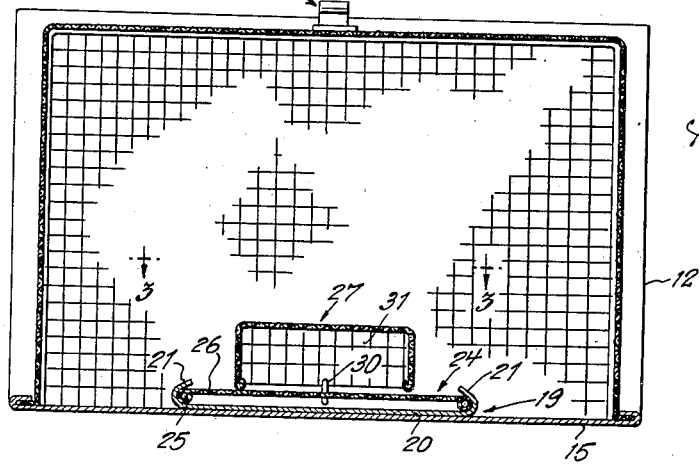
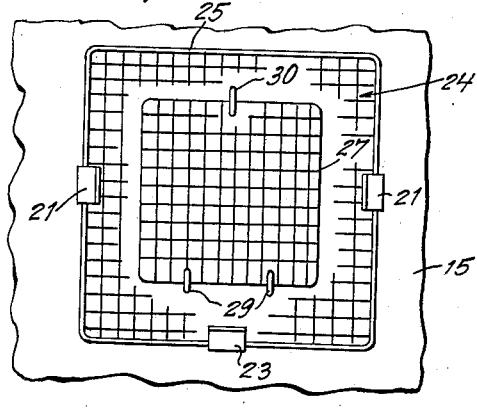
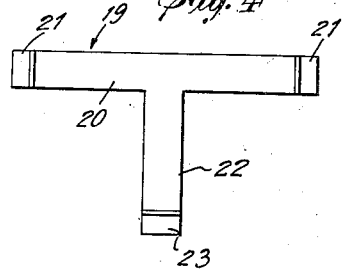
INVENTOR.
FREDERICK SCHREYER
BY
F. Ledermann
ATTORNEY Patented Apr. 20, 1943

2,316,888

UNITED STATES PATENT OFFICE 2,316,888

TRAP AND BAIT BOX THEREFOR

Frederick Schreyer, Jamaica, N. Y., assignor of forty-nine per cent to William Bicknese, Jamaica Beach, Jamaica, N. Y.

Application October 8, 1941, Serial No. 414,061

1 Claim. (Cl. 43—58)

This invention relates generally to traps which are adaptable to catching fish, crustaceans, animals, and various game, and more particularly to bait boxes for traps.

One object of the invention is the provision of a removable bait box in a trap, the bait box being adapted to contain not only dead but also live bait such as, for example, a chicken, rabbit, frog, fish, etc. The bait box may be removed from the trap and the live bait may be kept therein and stored. The bait box may also be used as a so-called "killie car," so that the killies or other small fish used as bait and kept therein may be used over and over again.

The trap illustrated in the accompanying drawing, in which the removable bait box is shown, has been set forth in detail in my co-pending application Serial No. 362,679, filed October 24, 1940, and issued November 25, 1941, as Patent No. 2,263,650, but it is not intended to limit the application of the removable bait box to that particular trap nor to any particular form of trap, as the removable bait box may be applied to or used in traps of different shapes and different types of construction.

The above and other objects will become apparent in the description below, reference being had to the accompanying drawing, and characters of reference in the description refer to like-numbered parts in the drawing. It is further not intended nor desired to limit the invention in any manner to the specific details of construction shown excepting within the spirit and scope of the invention and of the appended claim.

Referring briefly to the drawing, Figure 1 is a longitudinal cross-sectional elevation of a trap equipped with the removable bait box.

Figure 2 is a cross-sectional view taken on the line 2—2 of Figure 1.

Figure 3 is a fragmentary plan view of the bait box, taken in the direction of the arrows 3—3 of Figure 2.

Figure 4 is a plan view of the trap holding means per se.

Referring in detail to the drawing, the numeral 10 indicates a trap the housing of which is preferably made in whole or part of foraminous material. The forward end 11 of the trap is open, and the rear end is provided with a door 12, hinged at 13, and provided with releasable locking means 14.

The floor 15 supports the lower end, at the sill of the open entrance 11, of a ramp 16 which rises to a trap door 17 hingedly supported at 18 from the roof of the trap. As explained in the above-mentioned co-pending application, the creature hunted walks up the ramp 16, being attracted by the bait, pushes through the door 17, and as soon as it passes this door the latter closes by gravity and the creature is trapped.

Rearward of the trap door 17, a T-shaped retainer member 19 is secured to the floor 15 of the trap in any desirable manner or by any suitable means, not shown. The cross-arm 20 of the member 19 has its extremities turned up to provide friction grips 21, and the stem 22 thereof is similarly provided with a friction grip 23.

The removable bait box comprises a base or platform 24 which may be, as shown, in the form of a rectangular frame 25 supporting a foraminous sheet 26. A foraminous cover or hood 27 is hingedly secured at its rear end 28 to the base 24 by means of spaced loops or rings 29, about which the hood may be swung upward from the base 24 in the direction of the arrow in Figure 1. A hook 30 is pivotally secured to the front wall 31 of the hood, its open end being adapted to engage in the mesh of the base 24, to releasably lock the hood against the base.

The bait box, including the base 24, may be readily inserted into, or removed from, the retainer 19, in an obvious manner. The clips 21 serve as side guides to the movement of the base 24, and the clip 23 serves as a limit stop; all of the clips 21 and 23 serve also as frictional grips to retain the base 24 in releasably locked position on the floor of the trap.

The bait box may readily be opened to insert or to remove bait by undoing the hook 30 and swinging the hood 27 upward about its hinges (the loops 29), and is closed by the reverse operation. Live bait may obviously be kept confined within the bait box when the latter has been removed from the trap, and if the live bait used is fish, the box may be hung in the water by a cord or rope, not shown.

Obviously, modifications in form or structure may be made without departing from the spirit and scope of the invention.

I claim:

A trap comprising a base, a T-shaped member secured flat against said base, the extremities of the cross-arm and the extremity of the stem of said T-shaped member being turned upward and inward to provide yieldable friction grips thereon, a bait box in said trap having a platform slidably mounted between said first-named grips, said last-named friction grip serving simultaneously as a limit stop for said platform when the latter has been slid home between said first-named grips and as a yieldable lock to prevent withdrawal of said platform through said first-named grips, a hood on said platform having one lower edge thereof hingedly secured to said platform, and means for releasably locking said hood on said platform.

FREDERICK SCHREYER.